United States Patent [19]
Weiner et al.

[11] Patent Number: 5,103,090
[45] Date of Patent: Apr. 7, 1992

[54] OPTICAL ANGLE MEASURING METHOD AND APPARATUS PARTICULARLY FOR MACHINE TOOLS USING POLYGONS WITH LIGHT REFLECTING FACETS

[75] Inventors: Samuel Weiner, Gvvat Savion; Michael Dror, Tel Aviv, both of Israel

[73] Assignee: Optrocom Systems Ltd., Holon, Israel

[21] Appl. No.: 573,983

[22] Filed: Aug. 28, 1990

[51] Int. Cl.⁵ .................. G01D 5/34; G06K 7/10
[52] U.S. Cl. ............... 250/231.13; 250/230; 250/568
[58] Field of Search .......... 250/231.13, 231.12, 250/231.11, 568, 236; 33/1 N, 1 T, 1 PT; 356/373, 375; 350/6.8

[56] References Cited

U.S. PATENT DOCUMENTS

| | | | |
|---|---|---|---|
| 2,871,706 | 2/1959 | Fischer et al. | 250/231.12 |
| 3,283,408 | 11/1966 | Rothe et al. | 250/231.12 |
| 3,639,766 | 2/1972 | Ogden et al. | 250/231.13 |
| 3,802,779 | 4/1974 | Fletcher et al. | 250/231.13 |
| 4,914,291 | 4/1990 | Kan et al. | 250/231.12 |

FOREIGN PATENT DOCUMENTS

| | | | |
|---|---|---|---|
| 0112723 | 4/1990 | Japan | 250/231.13 |
| 1384944 | 3/1988 | U.S.S.R. | 250/231.13 |
| 1388714 | 4/1988 | U.S.S.R. | 250/231.13 |

*Primary Examiner*—David C. Nelms
*Assistant Examiner*—Michael Messinger
*Attorney, Agent, or Firm*—James E. Bradley

[57] ABSTRACT

An optical angle measuring apparatus for measuring the angular displacement of a polygon with light reflecting facets, for use, e.g., in machine tools. The apparatus comprises an autocollimator for projecting collimated light beams onto a facet of a polygon, a matrix array detector for detecting and transducing into angle measuring data the location of the focused light reflected from the polygon facets, a processor and angle error memory unit; for computing the difference between the angles of any given facet and an adjacent facet relative to a respective angle of an ideal regular polygon, and a control unit for processing and compensating for the said angle data to yield a corrected angle measurement. The corrected angle measurement is displayed on display means. A method for measuring the angular displacement of an object relative to a reference position employing the apparatus is also disclosed.

8 Claims, 3 Drawing Sheets

OPTICAL ANGLE MEASURING METHOD AND APPARATUS PARTICULARLY FOR MACHINE TOOLS USING POLYGONS WITH LIGHT REFLECTING FACETS

BACKGROUND OF THE INVENTION

The present invention relates to angle measurement systems (AMS) of the type using a polygonal body, which is externally attached to a workpiece or other object whose accurate angular displacement is to be determined, and an optical device adapted to translate the angular displacement of the polygon into a readable measurement, preferably relative to a predetermined reference or zero position.

In more detail, it has already been proposed to provide an AMS, such as schematically represented in FIG. 1, comprising a regular polygon P with n planar, light reflecting facets A1, A2, A3, ..., An, extending in planes which form angles a1, a2, a3, ..., an therebetween; an autocollimator C or similar beam deflection analyzing and transducing device; and a measuring device M, with analog or digital display represented (for the sake of illustration only) by scale S and pinhole or reticle R, indicating the deviation of the reflected light beam from the head-on or "O" position in either one (+a) or the other (−a) rotated directions of the reflective polygon facet A1.

One of the major deficiencies of such a measuring method and system is the strict requirement that all the angles a be equal to each other to an extremely high degree of precision; otherwise, when passing from one facet to the other (or taking a measurement of an angle greater than a and up to 360°), the error (e.g., (a1−a2), or (a1−a3), etc.) in the output measurement will be noticeable, thereby resulting in an incorrect reading.

For this reason, polygons suitable for use in this type of AMS are prohibitively expensive (on the order of a few thousands of Dollars).

SUMMARY OF INVENTION

Thus, the prime object of the invention is to remedy this disadvantage, namely, to avoid the necessity of using ultra-high precision polygons in autocollimator-based angle measuring systems.

A further object of the invention is to provide an AMS with pre-programmed means for compensating for the inevitably occurring deviations in the angles between any two adjacent polygon facets from the ideal regular polygon geometry.

It is a still further object of the invention to provide the AMS with computerized means to facilitate, among other functions, the measurement results, such as averaging or finding standard deviations.

It is a still further object of the invention to provide an AMS measurement up to 360° relative to a zero position.

According to one, general aspect of the invention there is provided an optical angle measuring apparatus for measuring the angular displacement of a polygon with light reflecting facets, for use, e.g. in machine tools, the apparatus comprising: means for directing a collimated light beam onto a facet of the polygon; means for detecting and transducing into angle measuring data the location of the focused light reflected from the polygon facets, along a range corresponding to a deflection angle greater than 360°/n, where n is the number of facets, so that reflections from two adjacent facets may be simultaneously detected; means for computing the difference between the angles of any given facet and an adjacent facet, relative to a respective angle of an ideal regular polygon with the same n facets; means for processing the said angle data to yield a corrected angle measurement; and means for displaying the corrected angle measurement.

According to another aspect of the invention a method for measuring the angular displacement of an object relative to a reference position is provided, comprising the steps of affixing a polygon with light reflecting facets in axial alignment with the angularly displaced object; directing a collimated light beam onto a facet of the polygon; detecting and transducing in angle measuring data the location of the focused light reflected from the polygon facet during the said angular displacement along a range corresponding to a deflection angle greater than 360°/n, where n is the number of facets; computing the difference between the angles of any given facet and an adjacent facet, relative to a respective angle of an ideal regular polygon with n facets; processing the said angle data to yield a corrected angle measurement; and displaying the corrected angle measurement.

These and additional features and advantages of the invention will be more clearly understood and appreciated in the light of the ensuing description of a preferred embodiment of the invention, given by way of example only, with reference to the accompanying drawings.

DETAILED DESCRIPTION OF THE INVENTION

Figure 1:
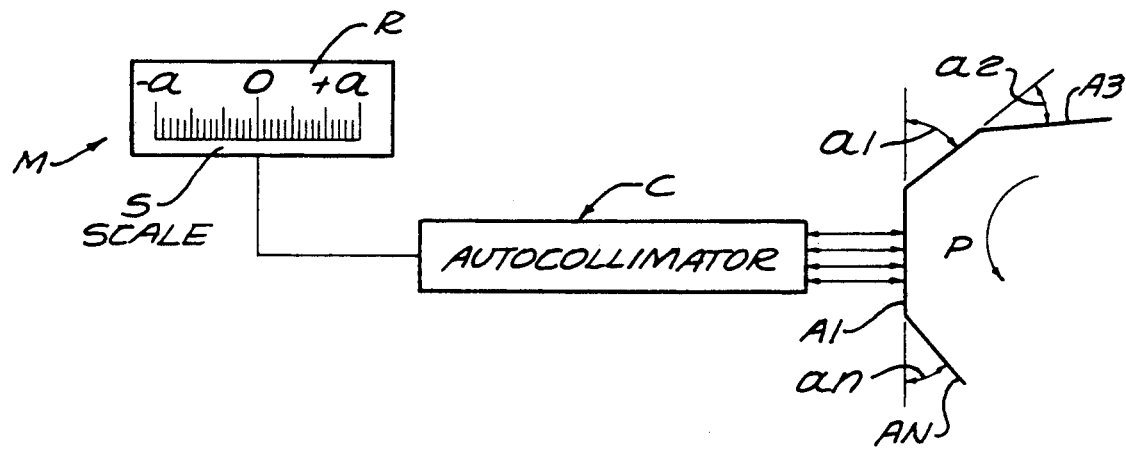
FIG. 1 is a schematic representation of a polygon-type AMS.
Figure 2:
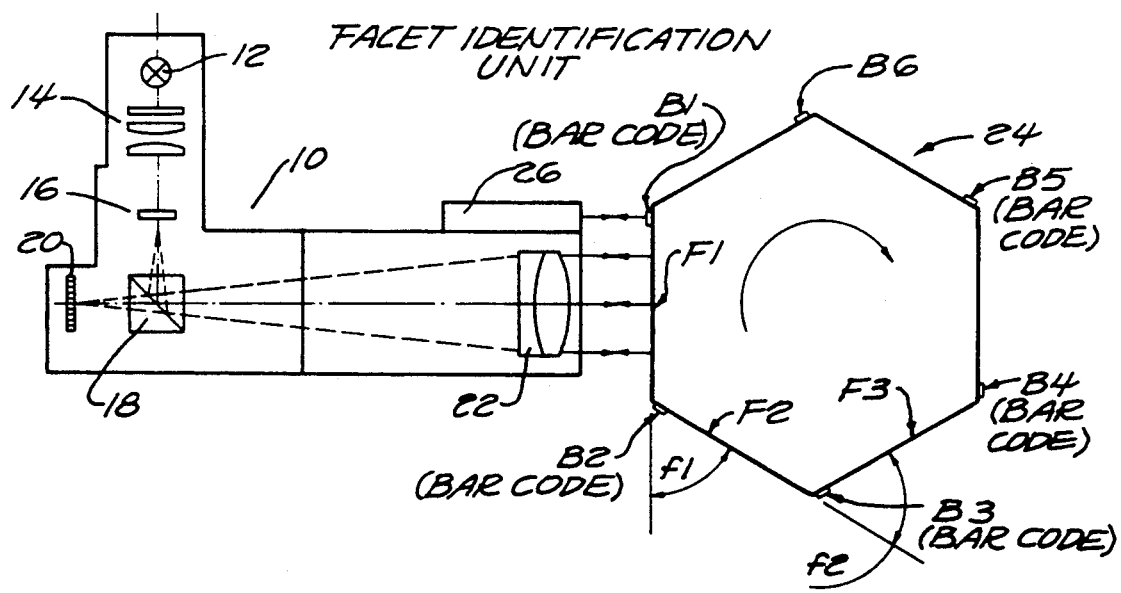
FIG. 2 shows schematically the construction of the angle measuring apparatus according to a preferred embodiment of the invention.

The angle measurement apparatus shown in FIG. 2 comprises, within housing 10 a light source 12, condensing lenses denoted 14, a pinhole or reticle mask 16, all aligned with beamsplitter 18. In crossing alignment there are provided a line or matrix array detector (MAD) 20 at one side of the beamsplitter 18, and objective lens(es) 22 at its other side. The MAD 20 may be of any known type, such as CCD (coupled charged device) comprised of an array of linear pick-cells.

Externally mounted to the housing 10, vis-a-vis facet F1 of polygon 24 so that it is optically coupled to the objective 22 (in parallel), is a facet identification unit (FIU) 26. As will be explained below in more detail, the FIU function is to identify which one of the polygon facets is under observation at any given measuring stage by way of, for example, optically readable markings (such as Bar Code) B1, B2, etc. applied at the margin of each facet F in order to enable computation of an absolute angular displacement from a determined reference or zero position.

Figure 3A:
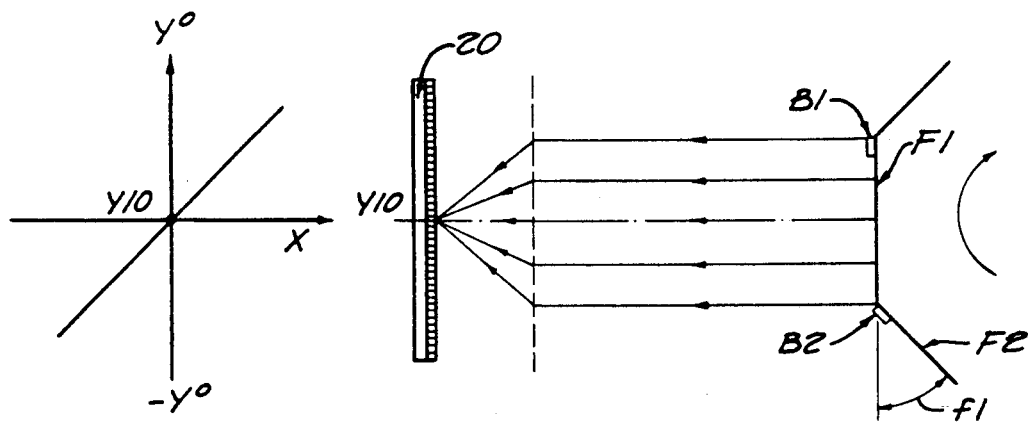
FIGS. 3a, 3b, and 3c illustrate stages of measuring involving a passage from one facet to another, with corresponding mask image reflections.
Figure 3B:
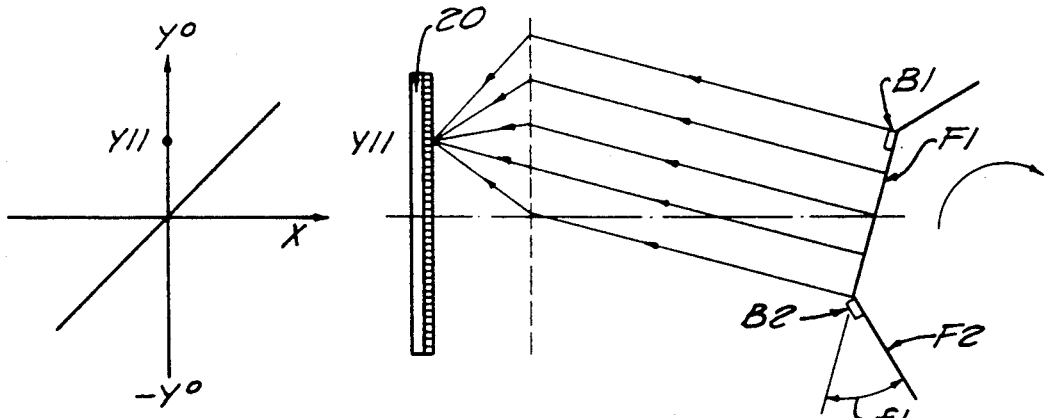
Figure 3C:
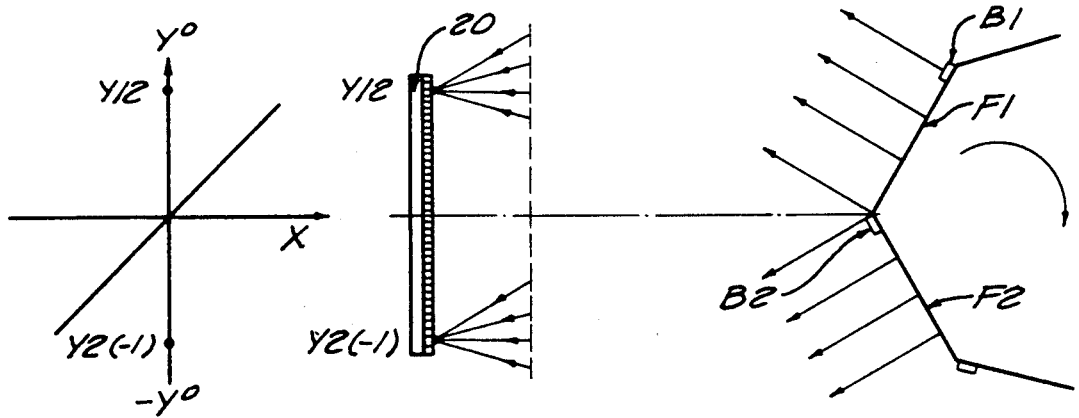

The method of angle measurement using the apparatus so far described will be readily understood with regard to FIGS. 3a-3c.

In the head-on or zero position shown in FIG. 3a, the facet F1 is precisely perpendicular to the optical axis of the objective 22 and the MAD 20. Measurement Y10, as shown on the orthogonal X-Y axis system on the left-hand side of FIG. 3a, is recorded and displayed on, say, display unit 36 (see FIG. 4). As the facet F1 proceeds to rotate, the focal point of the reflected light beams travels upward along the pick-cells of the MAD 20. A reading Y11 is received, as depicted in FIG. 3b.

The position of FIG. 3c, which is unique to the present invention, corresponds to a transient state, wherein the beam reflected from the facet F1, as well as the beam from the next-in-line facet F2 are received, at the same time, on the MAD screen.

Two, "over-lapping" readings Y12 and Y2(−1) are thus recorded, until the beams of facet F1 are completely deflected away from the active surface of the detector 20, and only Y2 readings (of the facet F2) remain measured and displayed.

Obviously, the amount (Y12−Y2(−1)) is directly indicative of the actual value of the angle f1, which angle need not—according to the principles of the present invention—be precisely equal to the remaining angles f2, f3, etc. Any deviations from the ideal regular polygon geometry are thus compensated and taken into account, with respect to each and every pair of facets, upon display of the output measurement, as will become apparent from the now following description of the control and display unit (CDU) and the calibration procedure.

It shall, therefore, be noted at this stage that calibration of the polygon is mandatory for avoiding accumulative errors when passing from one facet to the other—however, the actual identification of each facet and determination of each facet relative angular inaccuracy is only required during an absolute angular measurement routine.

Figure 4:
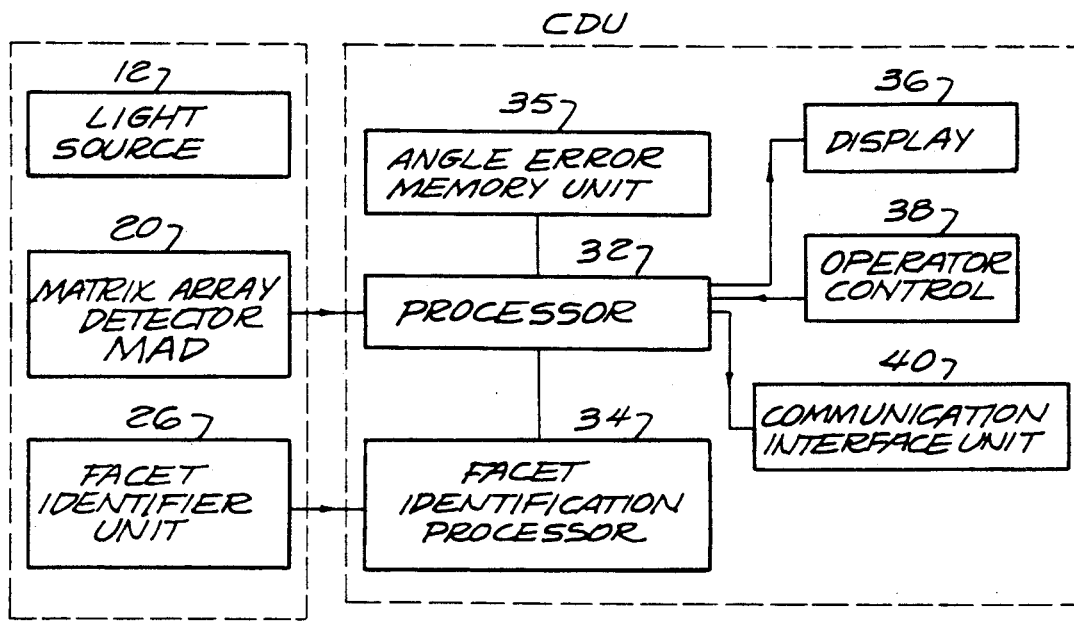
FIG. 4 is a block diagram of the control and display unit (CDU) employed with the apparatus of FIG. 2.

The CDU schematically shown in FIG. 4 for use in conjunction with the apparatus of FIG. 2, comprises a power supply unit (not shown) as required for the operation of light source 12, a matrix array detector 20 and a facet identifier unit 26, as well as for the CDU sub-units.

A processor unit 32 is provided, adapted to receive signals from the MAD and from facet identification processor 34 (associated with FIU 26).

The processor unit 32 also receives input from an Angle Error Memory Unit (AEMU) 35 which is loaded with the polygon calibration data, namely the specific angle deviations for each of the facets of the particular polygon, as will be explained with reference to FIG. 5.

Preferably, on the premises of a plant department or workshop, for every machine equipped with the apparatus of FIG. 2 for angular measurements an individual angles error memory unit 35, calibrated with respect to the polygon contained therein in a plug-in format will be available. Hence a single CDU can service a number of machines simply by inserting an especially prepared AEMU 35 at a new machine location.

The processor is further adapted to receive signals from an operator control (or keyboard) 38, facilitating mathematical analysis of the angle data, such as averaging several readings, computing standard deviations, plotting an angle as a function of time, etc.

Output from the processor is displayed, preferably on a digital display 36 for real time reading by the machine operator. Alternatively it can be downloaded using a communication interface unit 40 to a remote location.

Figure 5:
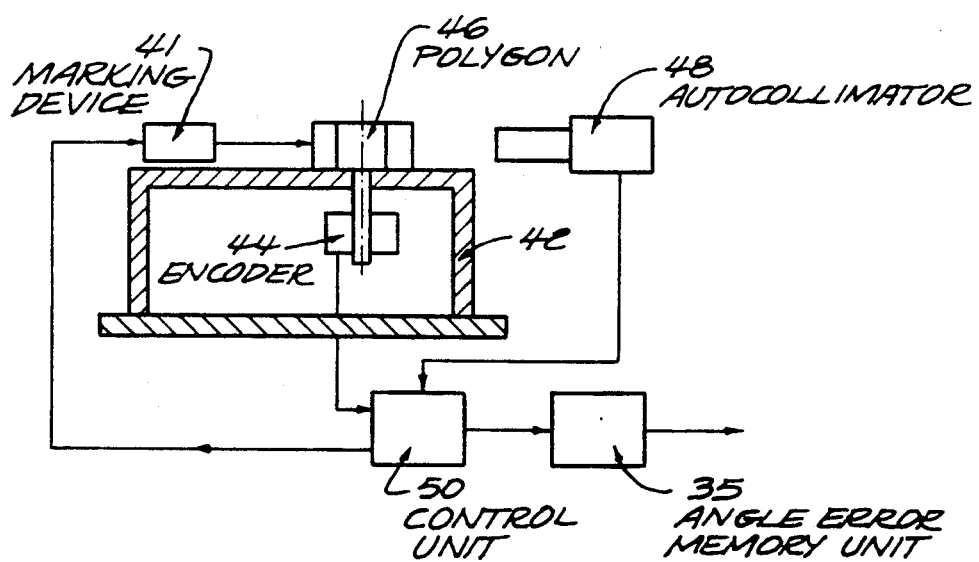
FIG. 5 illustrates the calibration setup routine.

Referring now to FIG. 5, there is shown a master calibration polygon base 42 with indexing means (not shown), and an encoder, generally denoted 44, for imparting and accurately sensing the rotational movement of a tested polygon 46.

An autocollimator 48 is provided, directed to the facets of the polygon 46. The output of the encoder 44 and of the autocollimator 48 are processed by control unit 50, so as to compute the exact deviations or errors between any pair of adjacent facets, (being the difference between the readings of the encoder and the autocollimator at its "zero" position).

Each facet is then marked by device 41 with its individual Bar Code for identification by the facet identification unit 26 (FIG. 2), while the respective angle deviation is memorized, say, by an EPROM element, (not shown) corresponding to the AEMU 35 which from then on is associated with—and only with—the specific calibrated polygon (46).

It has been thus established that the invention provides a useful solution to the problem at hand, namely overcoming the heretofore regarded as mandatory requisite of using ultra-highly precise and extremely to expensive polygons in the art of industrial angle measurement.

Those skilled in the art to which the invention pertains will readily appreciate that various changes, modifications and variations may be applied without departing from the scope of the invention as defined in and by the appended claims.

What is claimed is:

1. An optical angle measuring apparatus for measuring the angular displacement of a polygon with light reflecting facets, for use, e.g., in machine tools, the apparatus comprising:

means for directing collimated light beams projected onto a plurality of facets of the polygon;

means for detecting and transducing into angle measuring data the location of the collimated light reflected from the polygon facets, along a range corresponding to a deflection angle greater than 360°/n, where n is the number of facets, so that reflections from two adjacent facets may be simultaneously detected;

means for computing the difference between the angles of any given facet and an adjacent facet, relative to a respective angle of a perfectly shaped regular polygon with n facets;

means for processing the said angle data to yield a corrected angle measurement; and means for displaying the corrected angle measurement.

2. The apparatus as claimed in claim 1 wherein the detecting means comprise a matrix array detector.

3. The apparatus as claimed in claim 2 wherein the matrix array detector is a coupled charged device comprised of an array of linear pick-cells.

4. The apparatus as claimed in claim 3 further comprising means for optically identifying any of the polygon facets by markings initially applied to the respective facets.

5. The apparatus as claimed in claim 4 wherein the markings are Bar Codes.

6. The apparatus as claimed in claim 5 further comprising means for storing the differences between any given facet and an adjacent facet, relative to a respective angle of a perfectly shaped regular polygon with n facets.

7. The apparatus as claimed in claim 6 wherein the means for storing the deriations are in a plug-in form for plugging into the apparatus.

8. A method for measuring of angular displacement of an object relative to a reference position comprising the steps of:

affixing a polygon with light reflecting facets in axial alignment with the angularly displaced object;

directing a collimated light beam onto a facet of the polygon; detecting and transducing in angle measuring data the location of the focused light reflected from the polygon facet during the said angular displacement along a range corresponding to a deflection angle greater than 360°/n, where n is the number of facets;

computing the difference between the angles of any given facet and an adjacent facet, relative to a respective angle of a perfectly shaped regular polygon with n facets; processing the said angle data to yield a corrected angle measurement; and displaying the corrected angle measurement.

* * * * *